Patented Aug. 24, 1937

2,090,708

UNITED STATES PATENT OFFICE 2,090,708

PLASTIC CLEANING COMPOSITION

August J. Stahl, Kenilworth, N. J., assignor to Standard Oil Development Company, a corporation of Delaware No Drawing. Application October 8, 1932
Serial No. 636,956

4 Claims. (Cl. 87—5)

This invention relates to an improved plastic cleaning composition, particularly adapted for cleaning solid surfaces such as smooth surfaces like wall paper and irregular surfaces like the type of typewriters, rubber stamps, etc., and the like, and to methods of making same.

One object of the invention is to prepare a composition having such plasticity and adhesive characteristics that when contacted with a dirty surface such as type surface, wall paper, etc., the ink or dirt will adhere to the cleaning composition and be withdrawn from the surface being cleaned, when the cleaner is withdrawn.

Another object of the invention is to produce such a composition which will be economical, convenient to use and durable.

Broadly, this invention consists in preparing a cleaning composition by using a plastic polymerized hydrocarbon material, if necessary compounding therewith such other minor ingredients as may be desired, such as a pulverized filler, a liquid modifier, abrasive, coloring matter, perfume, etc., or blending with it other plastic rubber-like or doughy materials such as those that have been used heretofore. More specifically, I have found that as a suitable polymerized hydrocarbon material, I may use the colorless plastic substance resembling a synthetic pitch which is produced by polymerizing various unsaturated hydrocarbons in the presence of a volatile halide catalyst. For example, an olefine such as isobutylene may be polymerized at low temperature (about −10° C.) in the presence of boron fluoride. The product is a tough, viscous, semi-elastic, almost colorless plastic mass having a fairly high molecular weight, from 800 (as determined by the viscosity method described in Staudinger's Book, "Die Hochmolekularen Organischem Verbindungen," H. Staudinger Berlin 1932 Verlag Von Julius Stringer, page 56). This material is stable under ordinary conditions and will not deteriorate or harden with age as is the tendency with some other materials which have been used heretofore as the chief ingredient in plastic cleaning compositions.

In carrying out my invention I mix the polymerized hydrocarbon material, mineral filler if necessary and other minor ingredients if desired and mill them thoroughly together until the composition is a homogeneous mass. Mineral filler is used if the polymer alone is not of proper consistency and adhesiveness, the proportions of the plastic polymer and the filler being adjusted to obtain the proper degree of consistency and adhesiveness according to the use to which it will be put. If too much filler is used, the dirt, ink, etc. on the surface to be cleaned will not adhere quickly and firmly to the cleaning composition, and on the other hand if insufficient filler is used the composition may be too sticky for convenient use having a tendency to stick to the fingers of the person applying the cleaner and it may also stick to the surface being cleaned and may stick to the metal box or other container in which it is packed.

If desired, a liquid consistency modifier may also be used which may comprise any type of mineral or vegetable oil or it may be a relatively non-volatile solvent. If used at all it is used in only relatively small quantities.

For the sake of illustration only and not desiring to be limited thereby, the following general example is given of suitable proportions for carrying out the invention. The hydrocarbon polymer may be used alone or in proportions ranging from about 30% to 100%, and the mineral filler from 70% downwards, preferably from about 50 to 10% depending upon the amount of polymer used. From 0.1 to 5% of coloring matter is usually sufficient and perfume if used at all is used in only a sufficient amount to impart the desired degree of perfume or to mask the odor of any other ingredients. As mentioned above, a liquid consistency modifier may also be used in small amounts if desired, usually not exceeding 20%, the percentage which may be used depending largely on the proportion of polymer and filler. As filler, any relatively inert powdered material may be used such as calcium carbonate, chalk, barium sulfate, celite, fuller's earth, talc and the like; as one example of a suitable filler, I have used four parts of calcium carbonate to one part of barium sulfate. Other plastic materials which may be blended (usually less than 50%) with the main plastic polymer may be rubber, factice, paraffin wax, tung oil gel, bread dough, etc. As suitable modifiers which may be used, the following are mentioned: a mineral oil having a viscosity in the range of a lubricating oil, a vegetable oil such as cottonseed, castor, linseed and the like, or a relatively non-volatile solvent material such as the higher alcohols, glycerin, and the like.

After the materials comprising the composition have been measured or weighed out, they are mechanically mixed together in any suitable apparatus capable of making a homogeneous mixture free from lumps. After the mixing is completed, the composition is then formed in suitable shaped pieces and wrapped in any desired type of container, preferably metallic, or some type of non-absorptive paper.

When this composition is used for cleaning, it is contacted in any suitable manner with the dirty surface to be cleaned and then removed. The dirt adheres to the composition, leaving the solid surface clean and the composition may be used again and again simply by preparing a fresh surface by repeated kneading in the hand, as is commonly done with such plastic cleaners. For cleaning irregular surfaces such as typewriter type, sculptures, monuments, oil paintings, etc. the cleaner should be pressed onto the surface to be cleaned, whereas for wall paper, stained glass windows, and other relatively smooth surfaces, a stroking contact motion is usually best.

Several specific examples are given herebelow of formulas which have been found adapted for use as cleaners for surfaces such as typewriter type, for wall paper, and other uses:

Formula No. 1

| | |
|---|---|
| Polymer | 38.4% |
| Talc | 27.9% |
| Tung oil gel | 28.9% |
| Mineral oil | 5.7% |
| Glycerin | Small amount |

Formula No. 2

| | Percent |
|---|---|
| Polymer | 44.2 |
| Talc | 45.6 |
| Glycerin | 4.4 |
| Paraffin | 5.8 |

Formula No. 3

| | Percent |
|---|---|
| Polymer | 58 |
| Tung oil gel | 42 |

Although I have described the particular method in which one certain kind of hydrocarbon polymer is formed, I do not desire to be limited to any particular method of preparation. It is within the scope of my invention to use any polymerized hydrocarbon of the type heretofore specified which has the desired plastic and adhesive characteristics and which may be suitably modified in consistency by the addition of inert mineral fillers, liquid modifiers, etc. such as I have described above. The plastic product should preferably be derived by polymerization of relatively pure materials so that the resulting polymer will be colorless or at least substantially free from any impurities which might decrease the durability of the finished composition.

I do not desire to be limited to any of the specific illustrations of the invention given as there may be relatively wide variations in the kinds and proportions of materials used without departing from the scope of the invention and I desire to be limited only by the following claims by which it is my invention to claim all inherent novelty as broadly as the prior art permits.

I claim:

1. A plastic non-hardening cleaning composition, containing as its chief plastic ingredient a non-hardening polymer of isobutylene having a molecular weight above 800, containing intimately admixed therewith a pulverized inert mineral filler, said mixing composition having a texture and consistency adapted for kneading in the hand.

2. A composition according to claim 1 containing a small mount of substantially non-volatile liquid consistency modifier.

3. A composition according to claim 1 containing a small amount but not exceeding 20% of mineral oil having a viscosity in the range of a lubricating oil.

4. A composition according to claim 1, containing about 10–50% mineral filler.

AUGUST J. STAHL.